United States Patent [19]

Asada

[11] Patent Number: 5,121,657
[45] Date of Patent: Jun. 16, 1992

[54] SHIFT CONTROL SYSTEM FOR AUTOMATIC TRANSMISSIONS

[75] Inventor: Toshiyuki Asada, Toyota, Japan

[73] Assignee: Toyota Jidosha Kabushiki Kaisha, Toyota, Japan

[21] Appl. No.: 733,886

[22] Filed: Jul. 22, 1991

[30] Foreign Application Priority Data

Jul. 24, 1990 [JP] Japan .................... 2-195674
Jul. 30, 1990 [JP] Japan .................... 2-201725

[51] Int. Cl.$^5$ ............................................. F16H 61/10
[52] U.S. Cl. ............................................. 74/866
[58] Field of Search ........................ 74/866; 364/424.1

[56] References Cited

U.S. PATENT DOCUMENTS

| 4,947,331 | 8/1990 | Speranza | 74/866 X |
| 4,955,257 | 9/1990 | Terayama et al. | 74/866 |
| 5,067,373 | 11/1991 | Kyohzuka et al. | 74/866 |

FOREIGN PATENT DOCUMENTS

| 59-10749 | 1/1984 | Japan . |
| 60-57036 | 4/1985 | Japan . |
| 61-103042 | 5/1986 | Japan . |
| 61-122035 | 6/1986 | Japan . |
| 62-170444 | 10/1987 | Japan . |
| 63-101549 | 5/1988 | Japan . |

Primary Examiner—Dirk Wright
Attorney, Agent, or Firm—Oblon, Spivak, McClelland, Maier & Neustadt

[57] ABSTRACT

A shift control system for an automatic transmission which can be set both at main gear stages selected on the basis of the running state of a vehicle and at intermediate gear stages having gear ratios intermediate between those of the main gear stages. The shift control system comprises: a running state detector for detecting the running state; a shift decider for deciding a main gear stage to be set, on the basis of the running state detected; a condition decider for deciding whether or not a shift between the main gear stages decided by the shift decider satisfies a predetermined condition; and an intermediate stage setter for deciding an intermediate stage to be set in place of the main gear stage, which was decided by the shift decider, on the basis of the result decided by the condition decider.

15 Claims, 5 Drawing Sheets

SHIFT CONTROL SYSTEM FOR AUTOMATIC TRANSMISSIONS

BACKGROUND OF THE INVENTION

The present invention relates to a system for controlling a shifting in an automatic transmission and, more particularly, to a system for controlling a shifting of an automatic transmission which can be set both at main gear stages to be used for ordinary runs and at intermediate stages having gear ratios intermediate between those of the main gear stages.

As is well known in the art, a shift in the automatic transmission is effected on the basis of the data relating to an engine load such as the throttle opening and the data relating to a vehicle speed. The automatic transmission is shifted down, if the engine load increases or if the vehicle speed drops, but is shifted up if the engine load decreases or if the vehicle speed rises. The gear ratios of gear stages to be set are given relations close to the geometric series so as to improve the power performances so that the driving forces (or torques) to be attained at the individual gear states differ to some extents. As a result, if the driving force is insufficient for the running resistance, for example, the accelerator pedal is depressed to establish the necessary driving force, thus causing the downshift. If the driving force is excessive, on the contrary, the accelerator pedal is released to reduce the throttle opening, thus causing the upshift.

For a running resistance at a certain vehicle speed, however, there may occur a case, in which the driving force is insufficient at some gear stage but excessive at a one-step lower gear stage. This case is exemplified by point P appearing in the diagram of running performance of FIG. 6. In this state, the driving force to be generated at the 3rd speed is excessive for the running resistance in the state of a vehicle speed $V_1$, but the driving force to be generated at the 4th speed is insufficient. If, in this case, the vehicle speed rises while the vehicle is running at the 3rd speed, the automatic transmission is shifted up to the 4th speed. At this 4th speed, the driving force is insufficient so that the automatic transmission is shifted down to the 3rd speed either as the vehicle speed drops or as the driver depresses the accelerator pedal. This so-called "busy shifting", in which the shifts are repeated, will deteriorate the riding comfortableness. Therefore, the shift control system, as disclosed in Japanese Patent Laid-Open No. 103042/1986, is constructed to inhibit any upshift if the shift frequency exceeds a predetermined value.

According to the system, as disclosed, the busy shifting is not caused because the shift itself is inhibited. Since, however, the gear stage is locked at a lower side for the running state, the engine speed is so disadvantageously increased that the mileage is degraded or that the noises grow serious.

According to another method for preventing the busy shifting, as disclosed in Japanese Patent Laid-Open No. 101549/1988, the acceleration after an up-shift is arithmetically determined to execute the up-shift, if the upshift is decided when the acceleration could be kept, or when the acceleration could not, the present gear stage would be hold.

According to this method of Japanese Patent Laid-Open No. 101549/1988, however, the upshift might be inhibited even if the engine has a driving force so sufficient for the running state that the engine speed increases to some extent. Since the run at the high speed of the engine is continued in that case, the method is accompanied by a problem that the mileage is degraded.

SUMMARY OF THE INVENTION

A major object of the present invention is to provide a shift control system for an automatic transmission, which can prevent the frequent shifting while retaining a more proper driving force.

Another object of the present invention is to provide a shift control system which makes effective use of both main gear stages having gear ratios close to the geometric series and intermediate stages having gear ratios intermediate between thouse of the main gear stages.

Still another object of the present invention is to provide a shift control system for shifting the automatic transmission not to the main gear stages but to the intermediate stages in case the shifting between the main gear stages is frequent.

A further object of the present invention is to provide a shift control system for controlling the shifting to the intermediate stages if it is decided that the acceleration of deceleration to be obtained in case of a shift from a main gear stage to another fails to fall within a predetermined range.

According to the present invention, therefore, there is provided a shift control system for an automatic transmission which can be set both at main gear stages selected on the basis of the running state of a vehicle and at intermediate gear stages having gear ratios intermediate between those of the main gear stages, which system comprises: running state detect means for detecting the running state; shift decide means for deciding a main gear stage to be set, on the basis of the running state detected; condition decide means for deciding whether or not a shift between the main gear stages decided by said shift decide means satisfies a predetermined condition; and intermediate stage setting means for deciding an intermediate stage to be set in place of the main gear stage, which was decided by said shift decide means, on the basis of the result decided by said condition decide means.

The condition decide means can be exemplified by either means for detecting the frequency of shifts between the main gear stages to decide whether or not the frequency exceeds a reference value or means for deciding whether or not the acceleration or deceleration to be obtained in case of a shift to a predetermined main gear stage is within a predetermined range.

Moreover, the intermediate stage setting means sets an intermediate stage in place of the main gear stage as the gear stage to be set, if it is decided that those conditions are not satisfied.

The above and further objects and novel features of the present invention will more fully appear from the following detailed description when the same is read with reference to the accompanying drawings. It is to be expressly understood, however, that the drawings are for purposes of illustration only and is not intended as a definition of the limits of the invention.

DETAILED DESCRIPTION OF THE PREFERRED EMBODIMENTS

Figure 1:
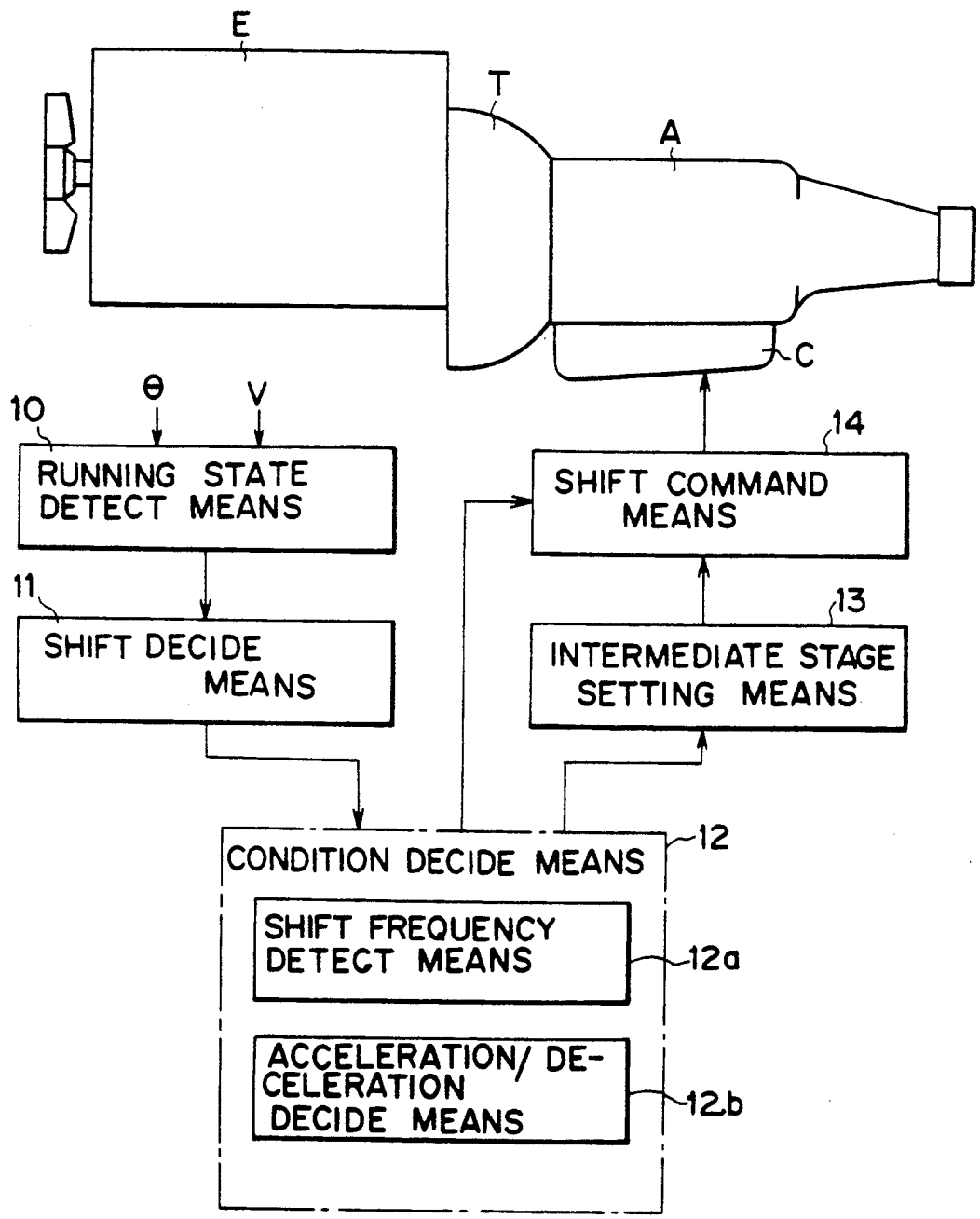
FIG. 1 is a block diagram showing the basic structure of a shift control system according to the present invention.

A basic structure will be described at first in the following. Reference letter E appearing in FIG. 1 designates an engine, to which an automatic transmission A is connected through a torque converter T. This automatic transmission A is equipped with a plurality of frictional engagement means including clutches and brakes to be hydraulially controlled. The automatic transmission A is constructed to be set to both the main gear stages, which are selected by engaging or releasing those frictional engagement means properly on the basis of the running conditions including the throttle opening, the vehicle speed and the turbine speed, and the intermediate stages which have gear ratios intermediate between those of the main gear stages. There is also provided a hydraulic control unit C for controlling the frictional engagement means. The hydraulic control unit C is operated through electric means such as solenoid valves.

In order to decide a gear stage to be set at the automatic transmission A, there is provide running state detect means 10 for detecting the running states such as the vehicle speed V and the throttle opening $\theta$ to output an electric signal. There is also provided shift decide means 11 for deciding a main gear stage to be set, on the basis of the running state detected by that running state detect means 10. The shift decide means 11 decides the gear stage in accordance with a map which is stored, for example, with the main gear stages to be set according to the running state. This shift decide means 11 is connected to the condition decide means 12. This condition decide means 12 is provided for deciding whether or not the condition for adopting the main gear stage decided by the shift decide means 11 is satisfied. This condition is exemplified by the frequency of shifts between the main gear stages and the acceleration or deceleration to be achieved at the main gear stage decided. For these decisions, the condition decide means 12 is equipped with shift frequency detect means 12a or acceleration/deceleration decide means 12b. The condition decide means 12 outputs a signal to intermediate stage setting means 13 if the frequency of shifts between the main gear stages exceeds a predetermined value or if the acceleration or deceleration to be established in case of the shift to a main gear stage fails to fall within a predetermined range. The intermediate stage setting means 13 is equipped with a map, in which the regions for setting the main gear stages and the intermediate stages are determined according to the running state such as the vehicle speed or the throttle opening. On the basis of the input signal coming from the condition decide means 12, the intermediate stage settling means 13 selects not a main gear stages, which has been decided by the aforementioned shift decide means 11, butan intermediate stage adjacent to that main gear stage. The shift decide means 11 and intermediate stage setting means 13 thus far described are connected with shift command means 14, which outputs a signal to the aforementioned hydraulic control unit C so as to execute a shift to either the main gear stage decided by the shift decide means 11 or the intermediate stage selected by the intermediate stage setting means 13. Incidentally, the shift command means 14 is adapted to preferentially set the gear stage which is selected by the intermediate stage setting means 13.

In the shift control system shown in FIG. 1, therefore, the running state such as the vehicle speed V or the throttle opening $\theta$ is detected by the running state detect means 10, and the shift decide means 11 is based upon the decision result to decide the main gear stage according to the running stage by means of the map. The condition decide means 12 detects the frequency of shifts, if executed to the main gear states, at its shift frequency detect means 12a to output its signal to the intermediate stage setting means 13 if the shifting frequency exceeds a predetermined frequency. Otherwise, the condition decide means 12 decides whether or not the acceleration or deceleration to be attained in case of a shift to the main gear stage decided by the shift decide means 11 is within a predetermined range, to output its signal to the intermediate stage setting means 13 if it is decided that the acceleration or deceleration fails to fall within that range. If the frequency of shifts between the main gear stages is less than the predetermined frequency or if the acceleration or deceleration obtained is within the predetermined range, the condition decide means 12 outputs its signal to the shift command means 14 so as to execute the shift to the main gear stage, which was decided by the shift decide means 11.

In response to the signal coming from the condition decide means 12, on the other hand, the intermediate stage setting means 13 selects an intermediate stage to be set and outputs its signal to the shift command means 14. Then, this shift command means 14 outputs a shifting signal to the hydraulic control unit C so that the shift to the aforementioned main gear stage or intermediate stage is executed.

In the shift control system shown in FIG. 1, therefore, if the upshift and downshift are frequently caused between the main gear stages or if the acceleration is sufficient for the main gear stage decided, a shift to the intermediate stage is executed in place of that main gear stage. As a result, the torque obtained after this shift is suited for the running state so that the frequent shifting can be prevented.

A more specific embodiment will be described in the following. The automatic transmission shown in FIG. 2 can be set to both the main gear stages, which are to be selected on the basis of the running conditions such as the throttle opening or the vehicle speed, and the intermediate stages which are to be selected, if the conditions other than the running conditions are satisfied, and which have gear ratios intermediate between those of the main gear stages. Specifically, this automatic transmission has its gear train constructed mainly of three single-pinion type planetary gear sets 1, 2 and 3. These individual planetary gear sets 1, 2 and 3 have their compartments connected in the following manners. The carrier 1C of the first planetary gear set 1 and the ring gear 3R of the third planetary gear set 3 are so connected to each other that they can rotate together. The ring gear 2R of the second planetary gear set 2 and the carrier 3C of the third planetary gear set 3 are also so connected to each other that they can rotate together.

Moreover, the first planetary gear set 1 has its sun gear 1S connected through a second clutch unit K2 to the carrier 2C of the second planetary gear set 2 and further through a fourth clutch unit K4 to the sun gear 2S of the second planetary gear set 2. Still moreover, the second planetary gear set 2 has its carrier 2C connected through a fifth clutch unit K5 to the sun gear 3S of the third planetary gear set 3.

Incidentally, the connecting structures of the aforementioned individual components may be quill or solid shafts or suitable connecting drums, which are adopted in the ordinary automatic transmissions.

An input shaft 4 is connected through a (not-shown) power transmission unit such as a torque converter or a fluid coupling to a (not-shown) engine. Between this input shaft 4 and the ring gear 1R of the first planetary gear set 1, there is interposed a first clutch unit K1 for connecting the two selectively. Between the input shaft 4 and the sun gear 1S of the first planetary gear set 1, on the other hand, there is interposed a third clutch unit K3 for connecting the two selectively.

For practical assemblies, there are restrictions on the arrangement of the individual components. Thus, suitable intermediate members such as connecting drums could naturally be interposed as the connecting members for the individual clutch units K1, K2, K3, K4 and K5.

On the other hand, the brake means for blocking the rotations of the rotating members of the aforementioned planetary gear sets 1, 2 and 3 are exemplified by: a first brake unit B1 for holding the rotation of the sun gear 3S of the third planetary gear set 3 selectively; a second brake unit B2 for holding the rotation of the carrier 2C of the second planetary gear set 2 selectively; a third brake unit B3 for holding the rotation of the sun gear 2S of the second planetary gear set 2 selectively; and a fourth brake unit B4 for holding the rotation of the sun gear 1S of the first planetary gear set 1 selectively. For pratical assemblies, moreover, suitable connecting members could be interposed between those brake units B1, B2, B3 and B4 and either the individual components to be held by the brake units B1, B2, B3 and B4 or a casing 6.

An output shaft 5 for transmitting the rotations to the propeller shaft and the counter (both of which are not shown) is connected to the ring gear 2R of the second planetary gear set 2 and the carrier 3C of the third planetary gear set 3.

Figure 2:
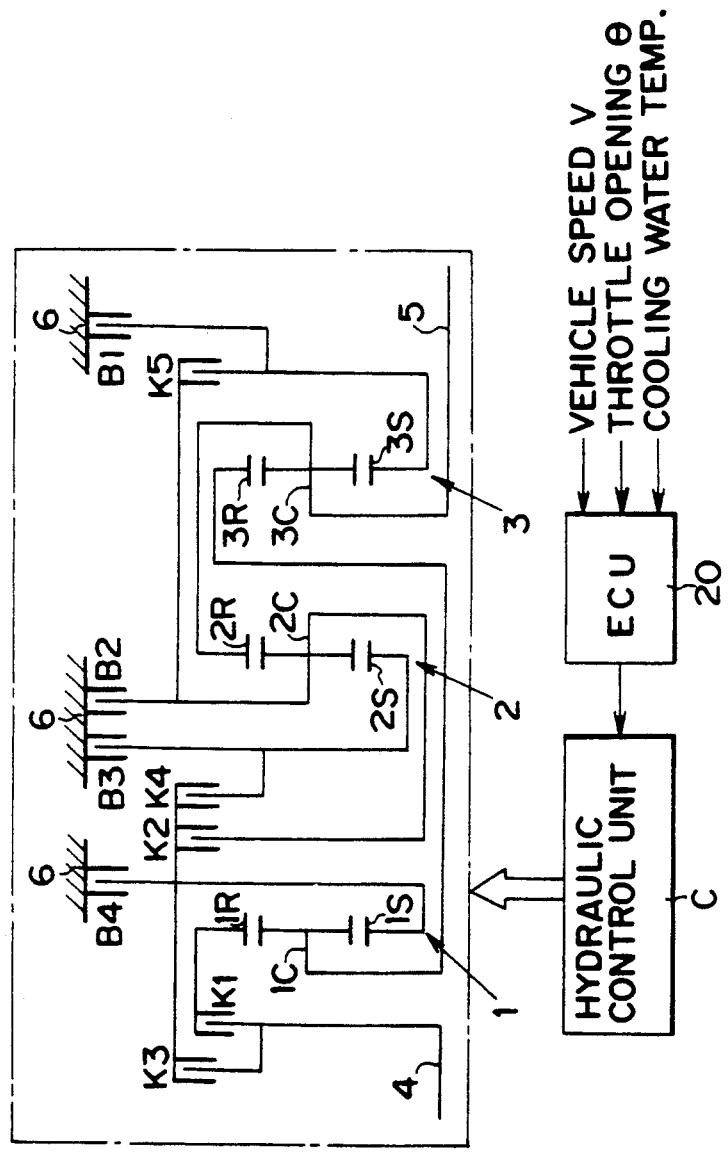
FIG. 2 is a block diagram showing one embodiment of the present invention.

The automatic transmission having the structure, as shown in FIG. 2, can set in principle ten forward and one reverse gear stages, which are prepared from the main gear stages of five forward and one reverse stages by adding the so-called "2.2th, 2.5th, and 2.7th speeds" between the forward 2nd and 3rd speeds and the so-called "3.2th and 3.5th speeds" between the forward 3rd and 4th speeds. For setting gear stages other than those for the 2.2th, 2.7th, 3.2th and 3.5th speeds, there are a plurality of engage/release combinations (i.e., the so-called "engage/release patterns") of the clutch means and the brake means, as tabulated as the clutch and brake application chart in Table 1. Table 1 also enumerates the gear ratios at the individual gear stages. In Table 1: symbols ○ indicate the engaged state; blanks indicate the released state; and symbols * indicate that the components may be engaged. Moreover, these components designated at * include: those such as the fifth clutch unit K5 or the first brake unit B1 at the 1st speed, which have their gear ratios and rotational states unchanged even if released; those such as the first brake unit B1 in the pattern of row b of the 4th speed, which have their gear ratios unchanged but their rotational states changed if released; and those such as the fourth clutch unit K4 and the third brake unit B3 in the pattern of row b of the 2nd speed, which have their gear ratios and rotational states unchanged even if released but if other means designated at the symbols * are engaged. In Table 1, moreover, the rows a, b, c, - - -, and so on at the 2nd, 3rd, 4th, 5th speed and reverse stages indicate such engage/release patterns for setting the corresponding gear stages that the rotational speeds of the rotating components of the planetary gear sets are different. The symbols ①, ②, ③, - - -, and so on indicate the kinds of the engage/release patterns, in which the rotational speeds of the rotating components of the planetary gear sets are not different. Furthermore, the gear ratios enumerated in Table 1 are those if the gear ratios (i.e., the ratios between the tooth numbers of the sun gears and the ring gears) of the individual planetary gear sets 1, 2 and 3 are set at $\rho=0.450$, $\rho_2=0.405$, and $\rho_3=0.405$, respectively.

TABLE 1

|  |  |  | Clutch Means | | | | | Brake Means | | | Gear Ratio |
| --- | --- | --- | --- | --- | --- | --- | --- | --- | --- | --- | --- |
|  |  |  | K1 | K2 | K3 | K4 | K5 | B1 | B2 | B3 |  |
| 1st |  | ① | ○ |  |  | ○ | ○ | * |  |  | 3.149 |
|  |  | ② | ○ |  |  | ○ | ○ | * | ○ |  |  |
|  |  | ③ | ○ |  |  | ○ | * |  | ○ | ○ |  |
| 2nd | a | ① | ○ | ○ |  |  | ○ | * |  |  | 2.037 |
|  |  | ② | ○ | ○ |  |  | ○ | * | ○ |  |  |
|  |  | ③ | ○ | ○ |  |  | * |  | ○ | ○ |  |
|  | b |  | ○ |  |  | ○ |  |  | ○ |  | 1.717 |
| 2.2th |  |  | ○ | ○ |  |  |  |  | ○ |  |  |
| 2.5th |  |  | ○ |  |  | ○ | ○ |  |  | ○ | 1.619 |
| 2.7th |  |  | ○ | ○ |  |  | ○ |  |  | ○ | 1.587 |
| 3rd | a | ① | ○ |  | ○ |  | * | ○ | * |  | 1.405 |
|  |  | ② | ○ |  | ○ |  | ○ | * | ○ |  |  |
|  | b |  | ○ |  | ○ |  | ○ |  | * |  |  |
|  | c |  | ○ | * | ○ |  |  |  | ○ |  |  |
|  | d |  | ○ |  | ○ |  |  |  | ○ |  |  |
| 3.2th |  |  | ○ | ○ |  |  | ○ |  |  | ○ | 1.299 |
| 3.5th |  |  | ○ |  | ○ |  | ○ |  |  | ○ | 1.117 |
| 4th | a | ① | ○ | * | ○ | ○ | * |  |  |  | 1.000 |
|  |  | ② | ○ | ○ | ○ | * | ○ |  |  |  |  |
|  |  | ③ | ○ | ○ | * | ○ | ○ |  |  |  |  |
|  |  | ④ | ○ | ○ | ○ | ○ |  |  |  |  |  |
|  | b |  |  | ○ | ○ | ○ |  | * |  |  |  |
| 5th | a |  |  | ○ | ○ |  | * |  | ○ |  | 0.712 |
|  | b |  |  | * | ○ | ○ |  |  | ○ |  |  |
|  | c |  |  | ○ | ○ |  |  | * | ○ |  |  |
| Rev | a | ① | ○ |  |  | ○ | ○ | * | * | ○ | −2.469 |
|  | b | ② | * |  |  | ○ | ○ | ○ | ○ | * |  |

The automatic transmission shown in FIG. 2 is provided with control means for setting any of the gear stages, as enumerated in Table 1, and for determining the engage/release pattern for that gear stage to be set. The control means is exemplified by both the hydraulic control unit C for feeding and relieving the oil pressures for engaging/releasing the aforementioned clutch means and brake means, and an electronic control unit (ECU) 20 for outputting an electric command signal to the hydraulic control unit C on the basis of various input data. The hydraulic control unit C is equipped with pressure regulation valves, shift control valves, and solenoid valves for actuating the shift control valves, and all of these valves to be adopted can be of the known type. Thus, the valves to be directly controlled by the electronic control unit 20 are exemplified by the solenoid valves of the hydraulic control unit C. On the other hand, the electronic control unit 20 is composed mainly of a microcomputer having arithmetic functions and is fed with signals including the vehicle speed V, the throttle opening $\theta$, the cooling water temperature, the running mode select signal and the brake signal.

The system shown in FIG. 2 has its forward gear stages comosed of main ones of 1st, 2nd, 3rd, 4th and 5th speeds and the remaining intermediate ones. Of these, the main gear stages are selectively set on the basis of the running condition such as the throttle opening $\theta$ or the vehicle speed V, and the intermediate stages are selected and set on other conditions such as the repeated frequency of shifts between the main gear stages.

Figure 6:
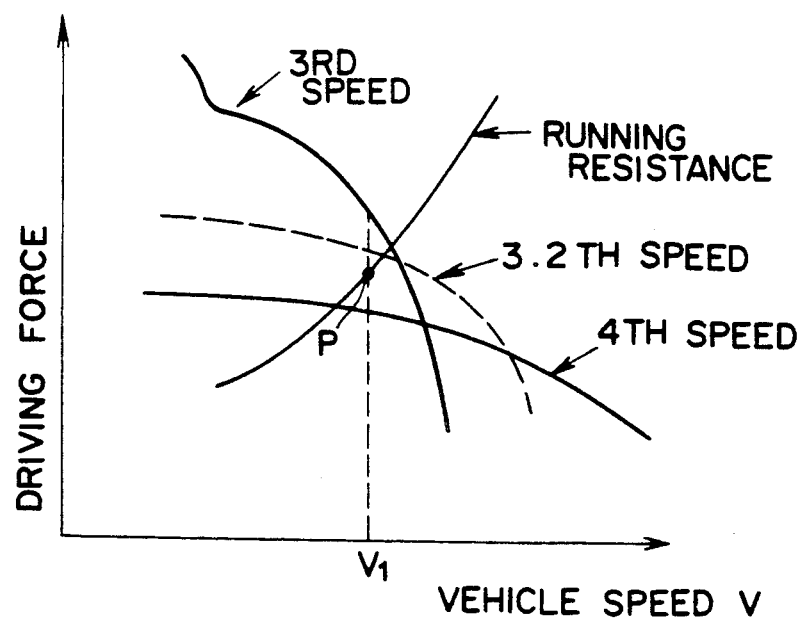
FIG. 6 is a diagram plotting the running performance of a vehicle equipped with an automatic transmission.

The controls for these operations will be specifically described in the following. If the running state is in the aforementioned point P of FIG. 6, the driving force is excessive at the 3rd gear stage but insufficient at the 4th gear stage. As a result, the shifting is repeated between the 3rd and 4th speeds if the vehicle speed $V_1$ is to be kept. This shifting frequency within a predetermined time period is counted by the electronic control unit 20. If the counted frequency exceeds a predetermined value, it is decided that the shifting is busy, and the 3.2th speed having a gear ratio between those of the 3rd and 4th speeds is selected and set. The curve indicating the running performance at the 3.2th speed is expressed by a broken line in FIG. 6 so that the driving force to be achieved is proper for the running state indicated by the point P, thus eliminating the repeated shifting.

Incidentally, the busy shifting can be avoided if the shifts are less frequently repeated between the main gear stages, and then the automatic transmission is set at one of the main gear stages.

Figure 3:
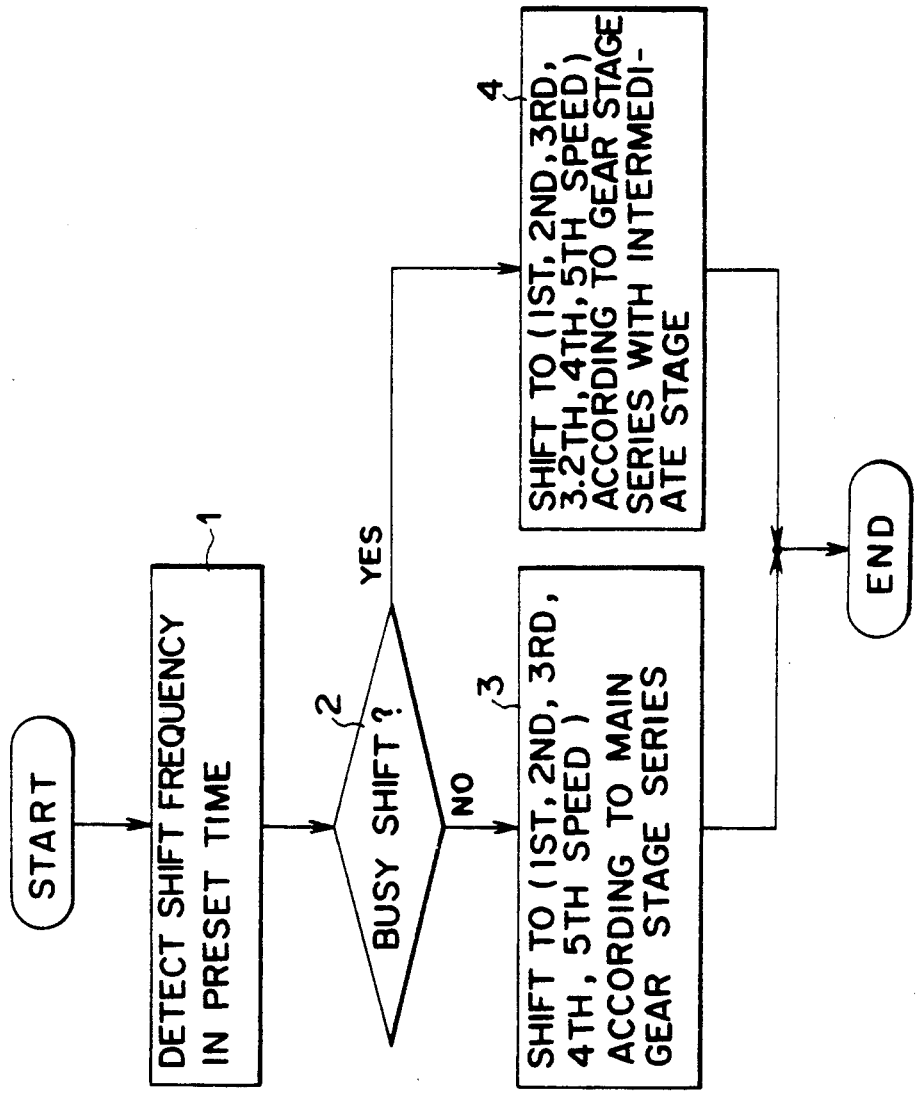
FIG. 3 is a flow chart showing a control routine for setting intermediate stages on the condition of the shifting frequency.

The controls thus far described are illustrated in the form of flow chart in FIG. 3. The shifting frequency in a predetermined time period is detected at Step 1. On the basis of this detection, it is decided (at Step 2) whether or not the shifting frequency is equal to or higher than a predetermined value, namely, whether or not the shifting is busy. If the decision result is "NO", the automatic transmission is shifted (at Step 3) according to the series of the main gear stages (for the 1st, 2nd, 3rd, 4th and 5th speeds). If the decision result of Step 2 is "YES", on the contrary, the automatic transmission is shifted (at Step 4) according to the gear stage series having the intermediate stages (for the 1st, 2nd, 3rd, 3.2th, 4th and 5th speeds). These gear stage series can be stored as the map in advance.

Incidentally, as the more gear stages can be set, it is possible to achieve the driving force proper for the more various running condition. In the automatic transmission shown in FIG. 2, therefore, it is conceivable to set all the gear stages, as enumerated in Table 1, on the running condition at all times. With this structure, however, the shifting will occur each time the running condition changes slightly. As a result, the shifting grows so frequent that the shifting shocks are deterioated to deterioate the durability of the frictional engagement means. On the contrary, the system thus far described according to the present invention is kept away from any especial increase in the number of the gear stages so that it can avoid the deterioation of the shifting shocks and the drop of the durability of the frictional engagement means.

If the automatic transmission is set at an intermediate stage, the difference in the gear ratio from that of the adjacent main gear stages is so small that the gear ratios lose the relations close to the geometric series in its entirety. In case, therefore, any intermediate stage is set, other main gear stages may be replaced by individually near intermediate stages so that the entire gear ratios may take relations as close to the geometric series as possible. The gear stage series of this kind are exemplified as follows: 1st speed←2nd speed←2.7th speed←3.2th speed←4th speed←5th speed.

On the other hand, the controls for returning the gear stage series once changed to the initial series may be accomplished on such suitable conditions that the vehicle has been stopped, and that the run at the main gear stages continue for a predetermined time period.

In the example thus far described, the condition for shifting to the intermediate stages adopts the shifting frequency between the main gear stages. In the system of the present invention, however, the condition for setting the intermediate stages can be based on that the acceleration or deceleration calculated in case of having shifted to the main gear stage decided on the basis of the running condition is smaller than a predetermined value or fails to fall within a predetermined range. These controls can be exemplified by deciding the main gear stages by means of the aforementioned electronic control unit 20, by calculating the acceleration on the basis of the vehicle specifications such as the gear ratio or the vehicle speed V at that main gear stage, and by deciding whether or not the difference between the calculated acceleration and the acceleration before the shift. On the other hand, the selection of the intermediate stage to be set may be accomplished by changing the map, for example, as will be specifically described with reference to the flow chart of FIG. 4.

Figure 4:
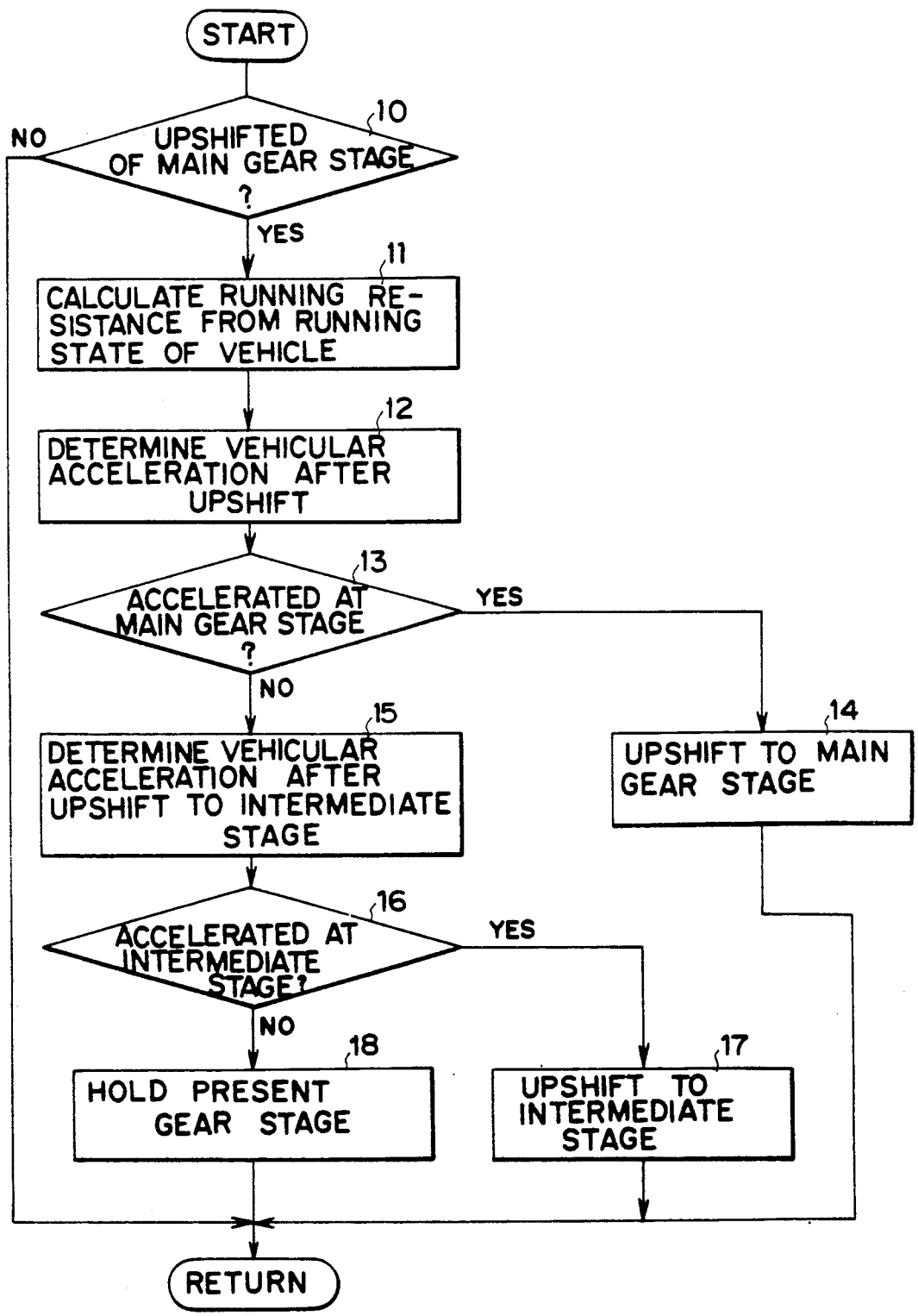
FIG. 4 is a flow chart showing a control routine for setting intermediate stages on the condition of the acceleration after a shift.

As shown in FIG. 4, it is decided at first at Step 10 on the basis of the running condition such as the vehicle speed V or the throttle opening $\theta$ whether or not the shift is an upshift from a predetermined main gear stage to another main stage. If the answer is "No", the routine is returned without any special control. If the answer is "YES", the routine advances to Step 11, at which the running resistance is calculated from the running state. At subsequent Step 12, the acceleration after the upshift is calculated on the basis of both the running resistance calculated at Step 11 and the vehicle specifications at the gear ratio of the main gear stage shifted up. At Step 13, moreover, it is decided whether or not the state calculated at Step 12 is in the "acceleration". If the answer is "YES", the result is that the driving force is surplus even after the aforementioned upshift to another main gear stage. In this case, therefore, the automatic transmission is shifted up (at Step 14) to that main gear stage. If the answer of Step 13 is "NO", on the contrary, the driving force becomes insufficient to drop the vehicle speed, if the automatic transmission is shifted up to the selected main gear stage. In this case, therefore, the routine advances to Step 15, at which the acceleration in case of the upshift from the main gear stage decided for the upshift to a lower intermediate stage is calculated from the aforementioned running resistance and the specifications of the vehicle after the upshift. Then, it is decided (at Step 16) whether or not the acceleration is "positive". If the answer is "YES", the routine advances to Step 17, at which the upshift to that intermediate stage is executed. In this case, the gear ratios of the gear train are moved away from the geometric series because of interposition of the intermediate stages. Thus, the main gear stages other than the aforementioned one may be changed to another intermediate stage so that the gear ratios of the whole gear train may be as close to the geometric series as possible. If the answer of Step 16 is "NO", on the contrary, no upshift is executed, but the present gear stage is held (at Step 18).

The aforementioned controls will be specifically described in the following. If an upshift to the 3rd speed (having a gear ratio of 1.405) is decided while the vehicle is running at the 2nd space (having a gear ratio of 2.037) of the main gear stages and if the driving force is sufficient for the run at the gear ratio of 1.405, the automatic transmission is shifted to the 3rd speed. If the driving force is insufficient, on the contrary, it is decided for the 2.5th speed (having a gear ratio of 1.619) whether or not the acceleration is positive. If the acceleration is decided to be positive, the shift to the 2.5th speed or one of the intermediate stages is executed. If the shortage of the driving force at the 4th speed is decided in case of the upshift from the 3rd to 4th speeds, a similar decision is performed for the 3.5th speed or an intermediate stage lower than the 4th sped. If an acceleration is decided at the 3.5 th speed, a shift to the intermediate 3.5th speed is executed. If the acceleration cannot be achieved even at the 3.5th speed, the present gear stage may be held, or the acceleration after the upshift to the lower 3.2th speed may be determined.

In the aforementioned shift control method, therefore, a shift accompanied by a slight reduction in the gear ratio can be accomplished by making use of the intermediate state, which is unused for the ordinary run, and by investigating whether or not an acceleration can be achieved from the various gear ratios after the upshift. As a result, it becomes possible to avoid the running state which retains a higher gear ratio for the vehicle speed. In other words, the run at a high engine speed can be avoided to improve the mileage.

Figure 5:
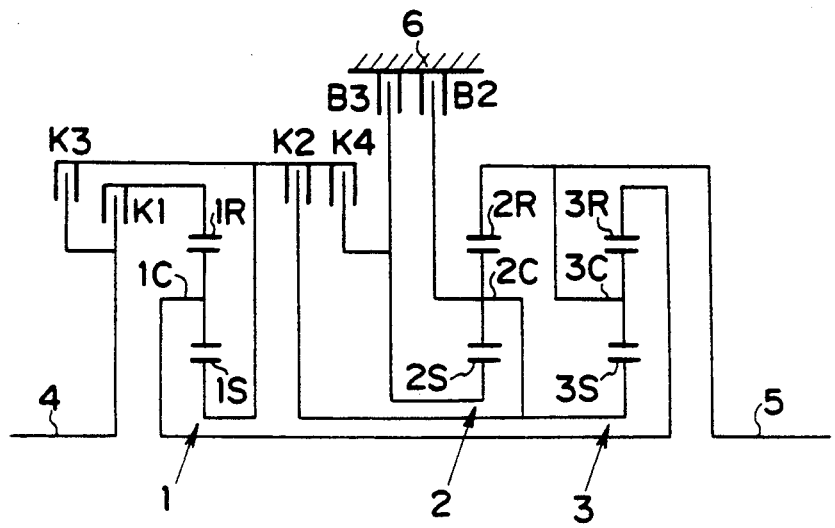
FIG. 5 is a skeleton diagram showing another gear train.

Incidentally, the embodiment thus far described is directed to the case, in which the "acceleration" having an increasing vehicle speed can be accomplished even after a shift. However, the acceleration to be referred to for the decision may be slightly in the negative direction (i.e., deceleration). In the foregoing embodiment, moreover, the description has been made by exemplifying the upshift. However, the method of the present invention can be likewise applied to the case of a downshift. In the foregoing embodiment, still moreover, the description has been made on the automatic transmission which is equipped with the gear train shown in FIG. 2. However, the present invention can be practiced on another automatic transmission capable of setting intermediate stages. This example of the gear train to be adopted in such automatic transmission is shown in a skeleton diagram in FIG. 5. This gear train, as shown, is prepared by omitting the fifth clutch unit K5, the first brake unit B1 and the fourth brake unit B4 from the gear train shown in FIG. 2 and by connecting the carrier 2C of the second planetary gear set 2 and the sun gear 3S of the third planetary gear set 3 integrally.

Furthermore, the automatic transmission to be controlled by the control system of the present invention can be exemplified by either a structure, in which any of the frictional engagement means shown in FIG. 2 is modified to have a one-way clutch, or any of the structures described in the specifications and drawings of Japanese Patent Application Nos. 185151/1989, 185152/1989, 186991/1989, 186992/1989, 205478/1989 and 280957/1989, all of which have been proposed by us.

Here will be synthetically described the advantages of the present invention in the following. According to the present invention, it is possible to prevent the frequent shifts and the shortage of the acceleration and to prevent a run at an excessively high engine speed. As a result, it is possible to improve the riding comfortableness and mileage of the vehicle.

What is claimed is:

1. A shift control system for an automatic transmission which can be set both at main gear stages selected on the basis of the running state of a vehicle and an intermediate gear stages having gear ratios intermediate between those of the main gear stages, comprising:

running state detect means for detecting the running state;

shift decide means for deciding a main gear stage to be set, on the basis of the running state detected;

condition decide means for deciding whether or not a shift between the main gear stages decided by said shift device means satisfies a predetermined condition; and intermediate stages setting means for deciding an intermediate stage to be set in place of the main gear stage, which was decided by said shift decide means, on the basis of the result decided by said condition decide means.

2. A shift control system according to claim 1, wherein said condition decide means includes shift frequency detect means for detecting the shift frequency between two main gear stages across an intermediate stage and for outputting a signal to said intermediate stage setting means if the shift frequency detected is equal to or higher than a predetermined frequency, and wherein said intermediate stage setting means includes means for deciding that said intermediate stage is to be set, in response to the signal of said shift frequency detect means.

3. A shift control system according to claim 1, wherein said condition decide means includes shift frequency detecting means for detecting the frequency of shifts between the main gear stages for a predetermined time period and for outputting a signal to said intermediate stage setting means if the frequency is equal to or higher than a predetermined value, and wherein said intermediate stage setting means includes means for deciding that said intermediate stage is to be set, in response to the signal of said shift frequency detect means.

4. A shift control system according to claim 1, wherein said shift decide means includes a first shift map having only the main gear stages to be set, and wherein said intermediate stage setting means includes a second shift map having the main gear stages and the intermediate stages to be set, whereby the shifting is accomplished according to the second shift map after said predetermined condition is satisfied.

5. A shift control system according to claim 1, wherein said condition decide means includes acceleration/deceleration decide means for deciding whether or not the acceleration or deceleration in case of a shift to a main gear stage decided by said shift decide means is within a predetermined range and, for outputting a signal to said intermediate stage setting means if said acceleration or deceleration fails to fall within said predetermined range, and wherein said intermediate stage setting means includes means for deciding that said intermediate stage is to be set, in response to the signal of said acceleration/deceleration decide means.

6. A shift control system according to claim 1, wherein said condition decide means includes acceleration/deceleration decide means for deciding both whether or not the acceleration or deceleration in case of a shift to a main gear stage decided by said shift decide means is within a predetermined range and whether or not the acceleration or deceleration in case of a shift to an intermediate stage decided by said intermediate gear setting means because the acceleration or deceleration fails to fall within said predetermined range is within another predetermined range, and for outputting a signal to said intermediate stage setting means if the acceleration or deceleration in case said intermediate stage is set falls within said another predetermined range, and wherein said intermediate stage setting means includes means for deciding that said intermediate stage is to be set, in response to the signal of said acceleration/deceleration decide means.

7. A shaft control system according to claim 6, wherein said acceleration/deceleration decide means includes output means for deciding whether or not the acceleration at the intermediate stage decided by said intermediate stage setting means, if the acceleration in case of an upshift to the main gear stage decided by said shift include means, is equal to or higher than another predetermined value, and for outputting a signal to said intermediate stage setting means if the acceleration at said intermediate stage is equal to or higher than said another predetermined value, and wherein said intermediate stage setting means includes means for deciding whether or not said intermediate stage is to be set, in response to the signal of said output means.

8. A shift control system according to claim 1, wherein said automatic transmission comprises:
an input shaft;
an output shaft;
a first planetary gear set including a first sun gear, a first ring gear, a pinion gear meshing with both said first sun gear and said first ring gear, and a first carrier supporting said pinion gear;
a second planetary gear set including a second sun gear connected integrally or selectively to said first sun gear, a second ring gear, a pinion gear meshing with both said second sun gear and said second ring gear, and a second carrier supporting said pinion gear; and
a third planetary gear set including a third sun gear connected integrally or selectively to said second carrier, a third ring gear connected integrally or selectively to said first carrier, a pinion gear meshing with both said third sun gear and said third ring gear, and a third carrier supporting said pinion gear and connected integrally or selectively to said second ring gear.

9. A shift control system according to claim 8, wherein said automatic transmission comprises:
first clutch means for connecting said input shaft and said first ring gear selectively;

second clutch means for connecting said first sun gear and said second carrier selectively;
third clutch means for connecting said input shaft and said first sun gear selectively;
fourth clutch means for connecting said first sun gear and said second sun gear selectively;
first brake means for holding the rotation of said second carrier selectively; and
second brake means for holding the rotation of said second sun gear selectively, and
wherein said output shaft is connected to said second ring gear or said third carrier.

10. A shift control method for an automatic transmission which can be set both at main gear stages selected on the basis of the running state of a vehicle and at intermediate gear stages having gear ratios intermediate between those of the main gear stages, comprising:
a first step of deciding a main gear stage to be set, on the basis of the running state;
a second step of deciding whether or not a shift between the main gear stages decided satisfies a predetermined condition; and
a third step of deciding an intermediate stage to be set in place of said decided main gear stage, on the basis of the answer of said second step.

11. A shift control method according to claim 10, wherein it is decided at said second step whether or not the shift frequency between said main gear stages is equal to or higher than a predetermined frequency, and
wherein, if said predetermined frequency is exceeded, it is decided at said third step that said intermediate stage is to be set.

12. A shift control method according to claim 10, wherein the frequency of the shifting between said main gear stages within a predetermined time period is detected at said second step, and
wherein, if said shifting frequency is equal to or higher than a predetermined value, it is decided at said third step that said intermediate stage is to be set.

13. A shift control method according to claim 10, wherein it is decided at said second step whether or not the acceleration or deceleration of the shift to said main gear stage decided at said first step is within a predetermined range, and
wherein, if said acceleration or deceleration fails to fall within said predetermined range, it is decided at said third step that said intermediate stage is to be set.

14. A shaft control method according to claim 10, wherein it is decided as said second step both whether or not the acceleration or deceleration of the shift to said main stage decided at said first step is within a predetermined range and whether or not the acceleration or deceleration, in case the intermediate stage decided by said intermediate stage setting means is set because said acceleration or deceleration fails to fail within said predetermined range, is within another predetermined range, and
wherein, if the acceleration or deceleration in case said intermediate stage is set falls within said another predetermined range, it is decided at said third step that said intermediate stage is to be set.

15. A shift control method according to claim 14, wherein, if it is decided that the acceleration in case of an upshift to the main gear stage decided at said first step is equal to or less than a predetermined value, the decision of said acceleration or deceleration depends upon whether or not the acceleration at said intermediate stage is equal to or higher than another predetermined value, and wherein, if it is decided that the acceleration at said intermediate stage is equal to or higher than said another predetermined value, it is decided at said third step that said intermediate stage is to be set.

* * * * *

UNITED STATES PATENT AND TRADEMARK OFFICE
CERTIFICATE OF CORRECTION

PATENT NO. : 5,121,657
DATED : June 16, 1992
INVENTOR(S) : ASADA

It is certified that error appears in the above-indentified patent and that said Letters Patent is hereby corrected as shown below:

```
Column 10, line 11, claim 1, change "an" to --at --;
          line 21, change "device" to --decide --.
Column 11, line 33, claim 7, change "include" to --decide--.
Column 12, line 54, claim 14, after "main" insert --gear--;
          line 59, change "fail" to --fall--.
```

Signed and Sealed this

Twelfth Day of April, 1994

Attest:

*Attesting Officer*

BRUCE LEHMAN

*Commissioner of Patents and Trademarks*